UNITED STATES PATENT OFFICE.

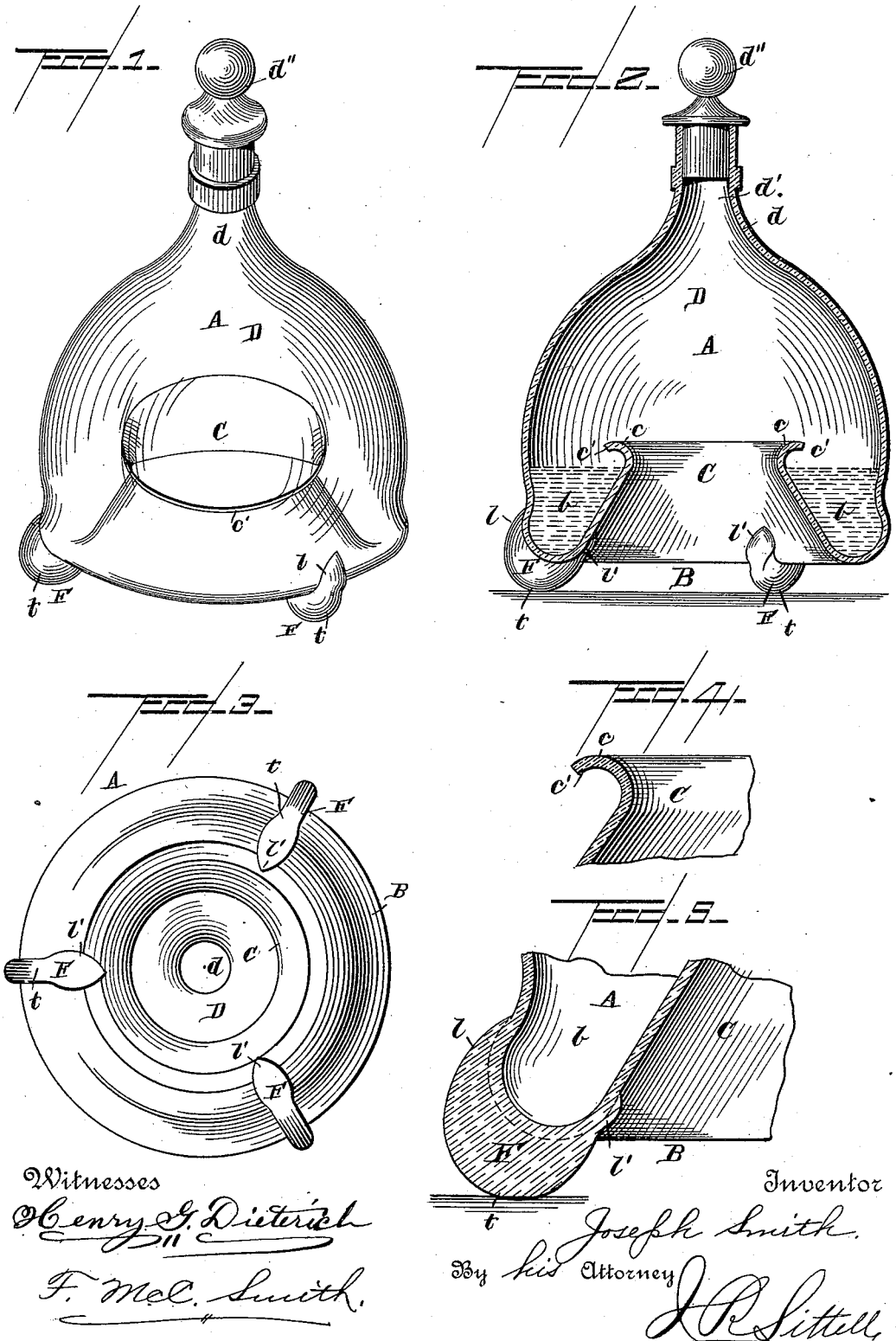

JOSEPH SMITH, OF PHILIPSBURG, PENNSYLVANIA, ASSIGNOR OF TWO-THIRDS TO WILLIAM S. SMITH AND W. M. HEIMACH, OF SAME PLACE.

INSECT-TRAP.

SPECIFICATION forming part of Letters Patent No. 426,967, dated April 29, 1890.

Application filed September 20, 1889. Serial No. 324,502. (No model.)

*To all whom it may concern:*

Be it known that I, JOSEPH SMITH, a citizen of the United States, residing at Philipsburg, in the county of Centre and State of Pennsylvania, have invented certain new and useful Improvements in Insect-Traps; and I do hereby declare that the following is a full, clear, and exact description of the invention, which will enable others skilled in the art to which it appertains to make and use the same.

My invention, though adapted to entrap all kinds of insects, is more particularly intended to be used as a fly-trap.

The object of my invention is to produce a fly-trap which shall be simple and durable in construction, safe and simple in its operation, and one that is ornamental in appearance.

My invention consists in certain novel details of construction and arrangement of parts whereby these objects are accomplished, as will be more fully specified and then claimed.

In the drawings forming a part of this specification, Figure 1 is a perspective view of my improved trap. Fig. 2 is a vertical sectional view of the same. Fig. 3 is an inverted plan view, and Figs. 4 and 5 show details of construction.

Referring to the drawings, in which similar letters of reference indicate similar parts, A indicates my improved fly-trap, which is formed of glass or other suitable material and approximately dome-shaped, the bottom B being pressed or bent inwardly and upwardly, and at its center is formed with a broad circular opening C, thus forming an annular channel $b$ between the sides of the trap and the bottom B. Around the edges of the circular opening C the bottom is bent or curved inwardly toward the vertical sides of the trap for a short distance, as at $c$, and then slightly downward at $c'$, the purpose of which will appear further on. The sides of the trap converge gradually from the bottom, thus forming the dome-shaped portion D, in the top portion of which is formed the neck $d$ of the trap, the opening $d'$ in said neck being very small in comparison with the circular opening C in the bottom, the opening $d'$ being normally closed by a suitable stopper $d''$. The dome portion D is preferably rather shortened or flattened, thus bringing its zenith nearer the opening in the bottom and also to the annular channel $b$, the advantages of which will appear further on.

To support the trap a sufficient distance above the table or other object, I employ the feet F, preferably three in number, and attached to the bottom portion of said trap at equidistant points. The feet F are each formed of the leg portions $l\ l'$ and the toe portion $t$, upon which the trap rests, the leg portions extending upwardly and are made diverging, as shown, the leg $l$ being secured to the outside of the vertical wall and the leg $l'$ to the under side of the inwardly-pressed bottom, the angle formed by the sides and bottom fitting in the angle formed by the legs. These legs are usually placed on just after blowing the body of the trap while the glass is in a semi-fluid state; but they may be placed on at other times, or, if desired, may be made integral with the main body of the trap.

To operate my improved trap, the same is inverted and any suitable liquid—such as beer or sweetened water—poured in through the opening C. The trap is then gently turned back and placed upon the table or other suitable place, a little sugar being placed beneath the opening C. The liquid in the trap occupies the annular channel $b$ and extends up the inwardly-bent portion of the bottom to a point where it begins to curve inwardly toward the vertical sides. It is well known that a fly can only with the greatest difficulty climb a surface curved similar to this curved edge. The flies after entering the trap soon fly or crawl into the liquid and are there drowned, and should any climb up the curved edges $c$ and $c'$ their escape is very uncertain, as they are very liable to drop back into the liquid again. A further advantage of the curved edges is that should any slight jar be given the trap the liquid is less liable to be spilled through the opening C. The dome being shortened, the surface is reduced, and the flies do not crawl about a great while before they become immersed. The opening in the neck of the trap being very small compared with the opening C, the gradual curvature of the dome D is not seriously interrupted, and, furthermore, should the stopper $d''$ become dislodged the flies are not liable to escape through the said narrow opening. The legs, being secured as described, are held securely in place, and also greatly strengthen the vertical walls and the inwardly-pressed bottom.

The trap, being made of glass, can be highly ornamented in various ways, and, if desired, may be made of colored glass, and thereby obscure the unsightly view of drowned flies.

When it is desired to clean the trap, the stopper $d''$ is withdrawn and the contents emptied through the opening in the neck.

I am aware that insect-traps have been heretofore constructed embodying a dome-shaped receptacle provided in its bottom with an opening, and, further, that such traps have been constructed with an opening the walls of which terminated in an overturned flange. To such constructions I lay no claim, my invention consisting in an improved article of manufacture comprising the combination of elements as set forth in my claim.

Having thus described my invention, what I claim as new, and desire to secure by Letters Patent, is—

As an improved article of manufacture, an insect-trap of the class described, formed of glass or other material and comprising the dome-shaped receptacle provided at its bottom with an enlarged opening, the wall of said opening projecting upwardly and inwardly to form an overturned flange, the elevating-feet, and a single contracted neck at the top of the receptacle, provided with an opening, all of said parts being integral, substantially as and for the purpose set forth.

In testimony whereof I affix my signature in presence of two witnesses.

JOSEPH SMITH.

Witnesses:
THOMAS CLEMSON,
WILLIAM LOWE.